United States Patent [19]
Okino et al.

[11] Patent Number: 4,637,648
[45] Date of Patent: Jan. 20, 1987

[54] REAR SEAT BACK LOCKING ARRANGEMENT FOR A MOTOR VEHICLE AND THE LIKE

[75] Inventors: Kiyomi Okino; Takumi Muramoto, both of Hiroshima, Japan

[73] Assignees: Mazda Motor Corporation; Delta Kogyo Co., Ltd., both of Hiroshima, Japan

[21] Appl. No.: 762,314

[22] Filed: Aug. 5, 1985

[30] Foreign Application Priority Data

Aug. 7, 1984 [JP] Japan ............................ 59-121576[U]

[51] Int. Cl.⁴ .............................................. B60N 1/10
[52] U.S. Cl. ...................................... 296/63; 297/379; 292/227; 292/DIG. 27
[58] Field of Search ............. 296/630, 65 R; 297/379; 292/227, 127, DIG. 37, DIG. 27

[56] References Cited

U.S. PATENT DOCUMENTS 3,170,725  2/1965  Komorowski ........................ 296/63
4,286,819  9/1981  Inoue et al. ......................... 296/65 R
4,561,694  12/1985  Mouri et al. ......................... 297/379

FOREIGN PATENT DOCUMENTS 58-78231  5/1983  Japan .

*Primary Examiner*—Robert R. Song
*Attorney, Agent, or Firm*—Burns, Doane, Swecker & Mathis

[57] ABSTRACT

An improved rear seat back locking arrangement, in which in a motor vehicle adapted to communicate its passenger compartment with its trunk room when a rear seat back is turned down forwardly, a key cylinder or cylinder lock is provided on the seat back, so that when the key cylinder is operated for locking, with the seat back held in the erected state, the seat back can not be released from the locked state, whereby such possibilities that a mischievous child enters the trunk room from the compartment without permission or baggage in the trunk room is taken out from the compartment side may be positively prevented.

8 Claims, 7 Drawing Figures

REAR SEAT BACK LOCKING ARRANGEMENT FOR A MOTOR VEHICLE AND THE LIKE

BACKGROUND OF THE INVENTION

The present invention generally relates to a motor vehicle and the like and more particularly, to a locking arrangement for a rear seat back portion in a motor vehicle in which an interior of a passenger compartment or cabin is arranged to be partitioned from an interior of a trunk room thereof by the rear seat back.

In some motor vehicles, there has been employed an arrangement in which the compartment interior is partitioned from the trunk room interior by the rear seat back portion so that said compartment interior may open into said trunk room interior by forwardly turning down the seat back portion, thereby to make it possible to load or unload baggage with respect to the trunk room also from the interior of the passenger compartment. In the above case, in order to prevent the seat back portion from being undesirably turned down forwardly during running of the motor vehicle, it has been a common practice, as disclosed, for example in Japanese Utility Model Laid-Open Publication Jikkaisho No. 58-78231, to arrange that the seat back portion is maintained at the erected state by providing a striker member and a hook member to be engaged with each other, respectively on the seat back portion and the vehicle body, with a simultaneous provision of an operating member for releasing the engagement between said striker member and hook member.

However, in the motor vehicle having the known arrangement as described above, for example, in the case where a mischievous child enters the trunk room from the passenger compartment by turning down the seat back forwardly, and a driver unaware of it should lock the seat back in the erected state, there will occur a dangerous situation that the child is kept closed in said trunk room. Moreover, there is a possibility that, even when a trunk lid for opening or closing the trunk room from outside has been locked, the baggage within the trunk room is undesirably taken out from the compartment interior side, if a door for the compartment is carelessly left unlocked.

SUMMARY OF THE INVENTION

Accordingly, an essential object of the present invention is to provide an improved rear seat back locking arrangement in a motor vehicle so as to permit access between the vehicle interior and a trunk room interior when a rear seat back is turned down in a forward direction, a key cylinder or cylinder lock (referred to as a key cylinder hereinafter) is provided on the seat back, so that when the key cylinder is operated for locking, with the seat back held in the erected state, the seat back can not be released from the locked state. The arrangement prevents the possibilities that a mischievous child enters the trunk room from the compartment without permission or baggage in the trunk room is taken out from the compartment side as described earlier may be positively prevented.

Another important object of the present invention is to provide a rear seat back locking arrangement of the above described type which is simple in construction and accurate in functioning, and is not readily damaged even when it is intended to forcibly release the seat back from locking.

In accomplishing these and other objects, according to one preferred embodiment of the present invention, there is provided a rear seat back locking arrangement for a motor vehicle and the like which includes a rear seat back arranged to partition an interior of a passenger compartment of the motor vehicle from an interior of a trunk room thereof so as to be capable of being turned down forwardly about its lower edge, and having a recess formed adjacent to a peripheral edge at its rear surface in a position confronting a vehicle body when erected, a striker means fixed at the vehicle body side to confront said recess of the rear seat back and adapted to project toward the rear surface of said rear seat back so as to be fitted into said recess, and a rear seat back locking means provided on the rear seat back and having a lock means and an operating means. The lock means provided in said recess further includes an engaging means engageable with said striker means so as to make it possible to lock the rear seat back, an a releasing means which enables the engaging means to be released from the locked state in association with movement of the operating means, while the operating means which effects locking and unlocking of said lock means includes a moving means to be moved through manual operation, and a cancelling means which cancels the lock releasing function of said lock means by the moving means while permitting movement of said moving means.

By the arrangement according to the present invention as described above, the lock means may be brought into the unlocked state by the operating means if the key cylinder is operated to the unlocking side for enabling the rear seat back to be turned down or tilted in a forward direction, while upon locking operation of the key cylinder, it becomes impossible to release the lock means or to turn down the seat back forwardly. In the above state, since the operating means can be depressed without actuating the releasing means, damages to said operating means and/or lock means due to any excessive force may be advantageously prevented. Meanwhile, owing to the construction that the operating means is constituted by the key cylinder, an improved locking arrangement having the locking capacity as described above can be provided through simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
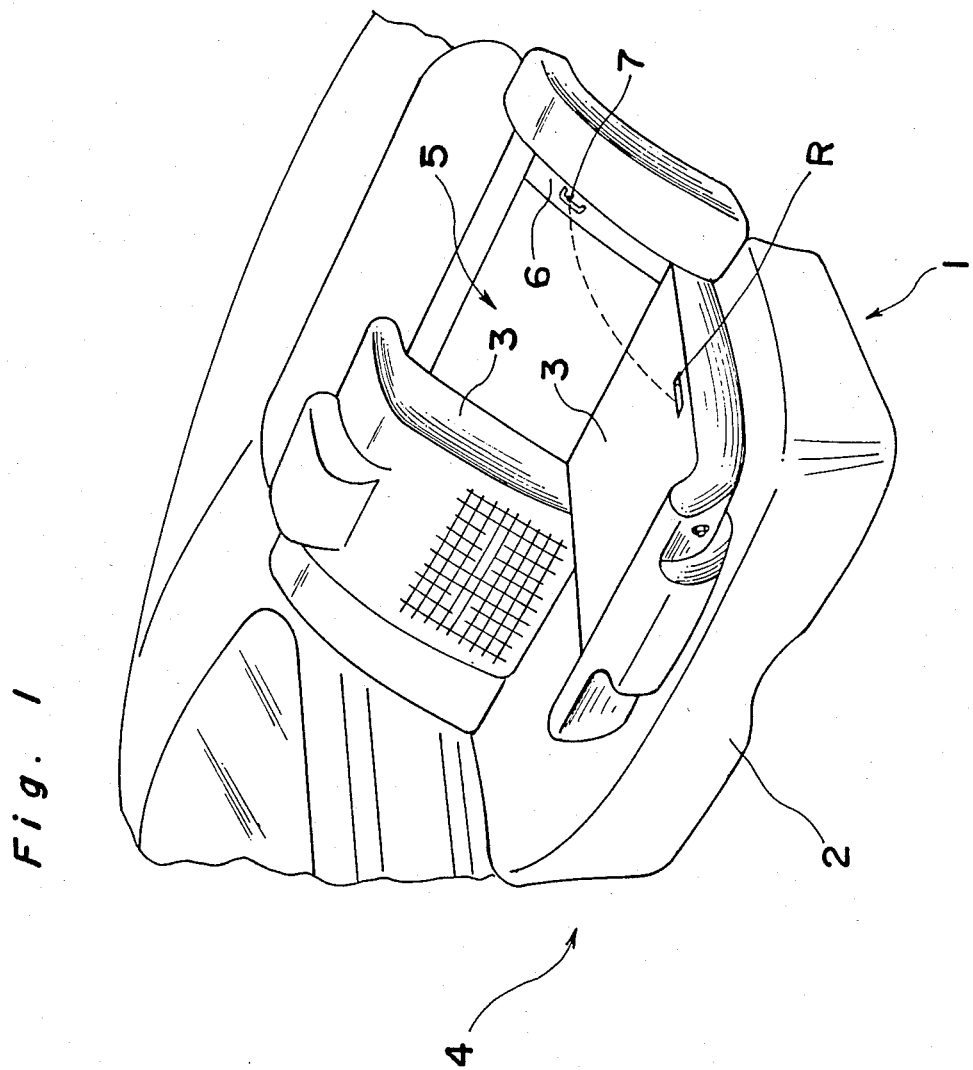
FIG. 1 is a perspective view showing an entire rear seat portion of a motor vehicle to which a rear seat back locking arrangement according to the present invention may be applied.

Before the description of the present invention proceeds, it is to be noted that like parts are designated by like reference numerals throughout the accompanying drawings.

Referring now to the drawings, there is shown in FIG. 1 a rear seat portion 1 provided at a rear side in a passenger compartment 4 of a motor vehicle, to which a rear seat back locking arrangement according to the present invention may be applied.

In FIG. 1, the rear seat portion 1 includes a seat bottom 2, and a seat back 3 (which is laterally divided into two portions in the example as illustrated) which is connected, at its lower edge, to a vehicle body or to said seat bottom 2 through a hinge means (not shown) so as to be capable of being tilted or turned down forwardly as shown for communication of an interior of the passenger compartment 4 with an interior of a trunk room 5 at the rear portion of the vehicle body. The seat back 3 as described above is provided with a locking arrangement L which locks the seat back 3 in an erected state through engagement with a U-shaped striker member 7 secured to the vehicle body 6 when the seat back 3 is turned into the erected state so as to partition the compartment 4 from the trunk room 5, or releases the seat back 3 from the locking or makes it impossible to release the locking.

Referring also to FIGS. 2 through 7, the rear seat back locking arrangement L according to the present invention generally includes a locking portion 20 provided at a lower portion in a recess R formed adjacent to a peripheral edge in the rear surface of the seat back 3 at a position confronting the vehicle body 6 when said seat back 3 is erected, and an operating portion 30 provided interiorly in the upper portion of the seat back 3 for releasing the engagement between the locking portion 20 and the striker 7 or for disabling such releasing through a key operation as described in detail hereinbelow.

Figure 3:
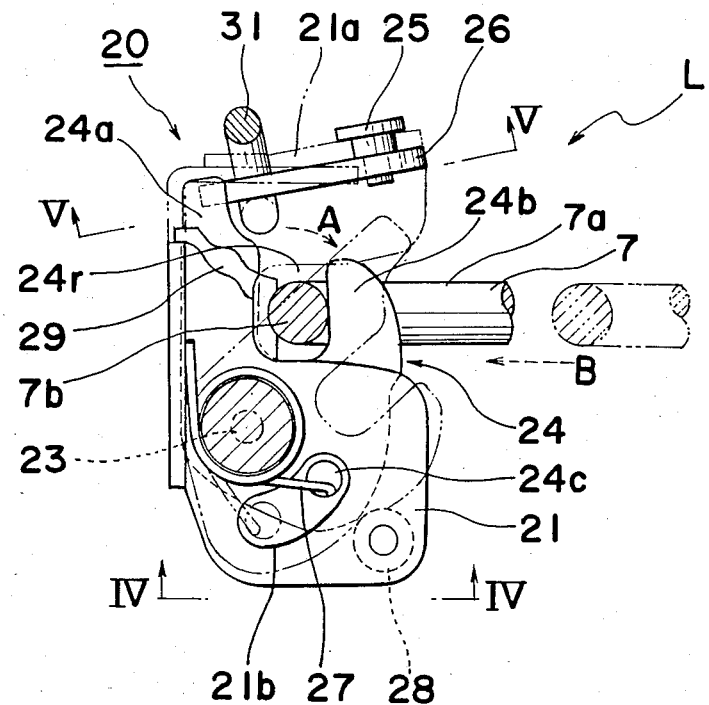
FIG. 3 is a cross section on an enlarged scale, taken along the line III—III in FIG. 2.
Figure 4:
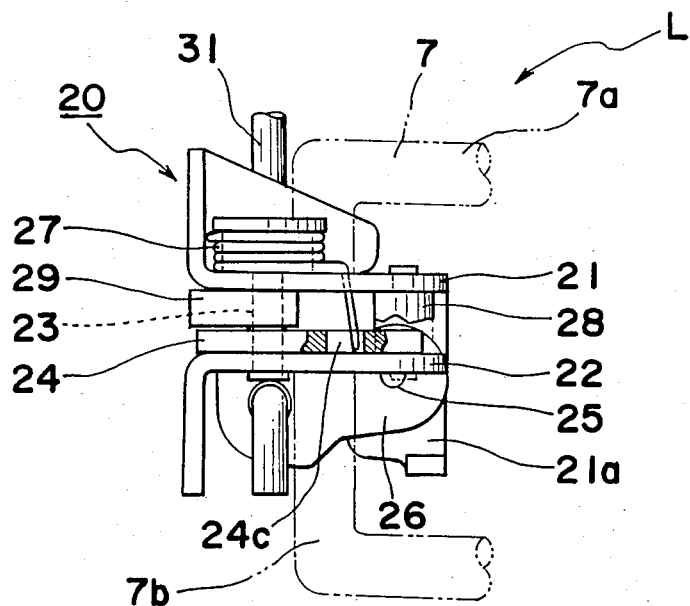
FIG. 4 is a view partially in section as observed in a direction of a line IV—IV in FIG. 3.
Figure 5:
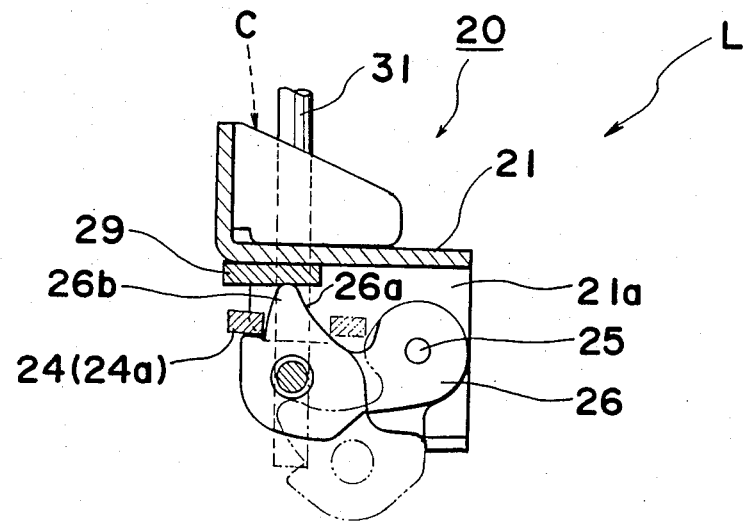
FIG. 5 is a cross section taken along the line V—V in FIG. 3.

The locking portion 20 is mounted on a bracket 9 fixed to a frame 8 of the seat back 3 by set screws 10, and as shown in FIGS. 3 through 5, mainly includes a pair of parallel first and second or upper and lower base plates 21 and 22, an engaging member 24 pivotally supported between said plates 21 and 22 by a shaft 23 for a pivotal movement in a horizontal direction and having first and second arms 24a and 24b so as to be formed into a bifurcated shape, with a notch or recess 24r provided therebetween, and a releasing member 26 pivotally supported for vertical movements by a pin 25, on a downwardly bent portion 21a provided at one side of said base plate 21.

The engaging member 24 is normally urged for rotation in a direction indicated by an arrow A in FIG. 3 by a spring 27 wound around the shaft 23, and having its one end engaged with the first base plate 21, and its other end inserted into a spring receiving hole 24c of the engaging member 24 through an arcuate elongated opening 21b formed in said plate 21, while a stopper member 28 is fixed between said first and second base plates 21 and 22 for restricting rotation of the engaging member 24 in the direction of the arrow A at a releasing position indicated by a chain line. Thus, in the case where the engaging member 24 is located at the releasing position indicated by this chain line, when the striker member 7 relatively comes in from the rear side in the direction of the arrow B, said U-shaped striker member 7 including a pair of spaced projecting bars 7a fixed to the vehicle body side and a connecting bar 7b connecting said bars 7a at distal ends thereof, enters a recess 24r between the first and second arms 24a and 24b at its connecting bar 7b, while turning said engaging member 24 in a direction opposite to the arrow A toward the engaging position indicated by a solid line in FIG. 3 against the spring 27. In connection with the above, in order to resiliently restrict the entry of the striker member 7 at a predetermined position, a buffer member 29 made of a rubber material is disposed between the engaging member 24 and the first base plate 21.

Meanwhile, the above releasing member 26, when it is located at the upper position indicated by a solid line in FIG. 5, enages the first arm 24a of the engaging member 24 located at the engaging position shown by a solid line in FIG. 3, so as to restrict the rotation of said engaging member 24 in the direction of the arrow A, and it is so arranged that, when a lower end of an operating rod 31 depending from the operating portion 30 provided at the upper portion is connected to the releasing member 26 and said rod 31 is moved in a direction indicated by an arrow C i.e. downwardly as shown in FIG. 5, the releasing member 26 is pivoted downwardly as shown by the chain line, and released from the engagement with respect to the first arm 24a of the engaging member 24, whereby said engaging member 24 is pivoted in the direction of the arrow A by the action of the spring 27.

Figure 2:
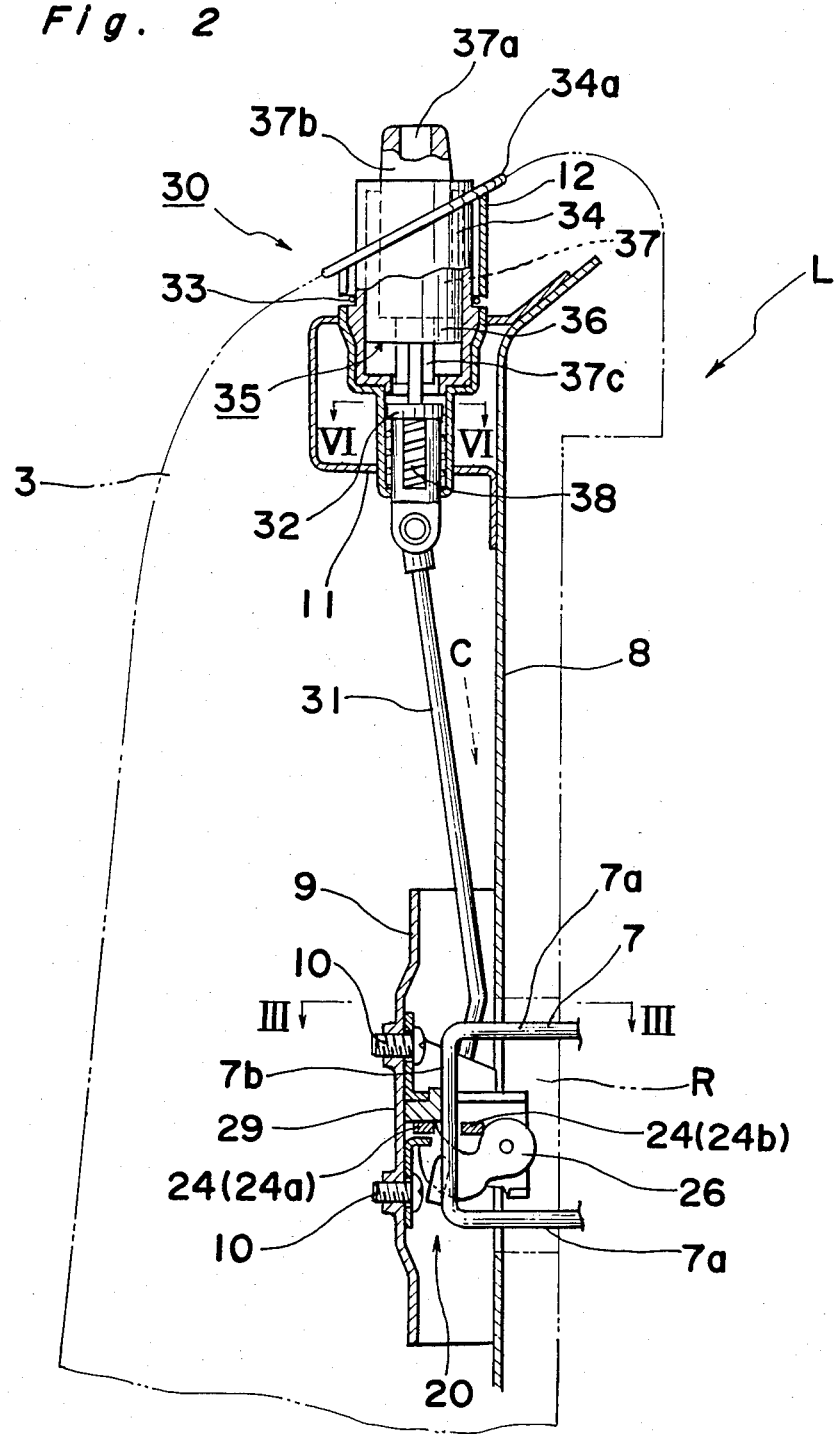
FIG. 2 is a longitudinal sectional view, showing on an enlarged scale, the rear seat back locking arrangement provided on a seat back of the rear seat portion as illustrated in FIG. 1.
Figure 7:
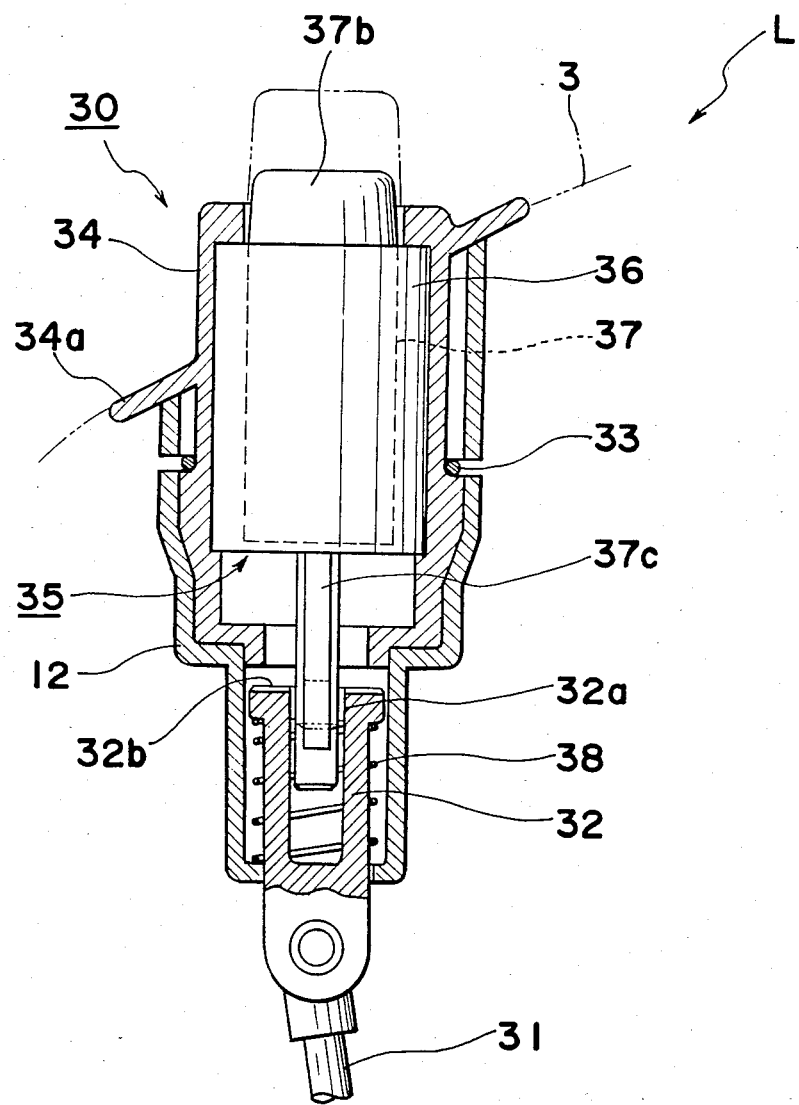
FIG. 7 is a longitudinal sectional view showing on an enlarged scale, a state of functioning of an operating member employed in the arrangement of FIG. 2.

On the other hand, as shown in FIGS. 2 and 7, the operating portion 30 is generally constituted by a key block 32 accommodated at the bottom portion of a casing 12 secured to the frame 8 of the seat back 3 through a bracket 11, a key cylinder case 34 accommodated in said casing 12 at the upper portion of the key block 32 so as to be fixed by a snap pin 33 and having at its upper portion, an inclined flange portion 34a directed along the upper surface of the seat back 3, and a key cylinder 35 fitted and held in said case 34.

Figure 6:
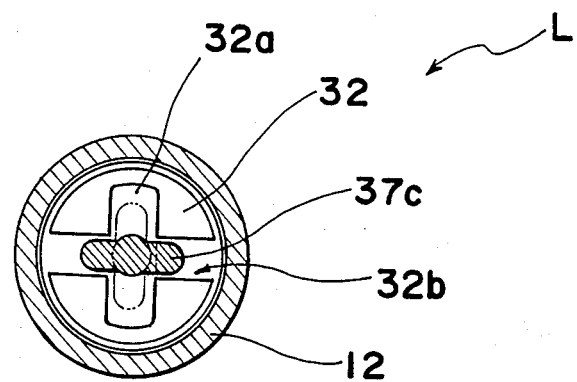
FIG. 6 is a cross section on an enlarged scale taken along the line VI—VI in FIG. 2.

The above key cylinder 35 further includes an outer cylinder 36, and an inner cylinder 37 which is arranged to be vertically movable with respect to the outer cylinder 36, and also, to be rotatable through a predetermined angle (e.g. 90°) with respect to the outer cylinder 36 upon insertion of a specific key (not shown) into a key insertion hole 37a provided in said inner cylinder 37. The upper portion of said inner cylinder 37 is formed into a pushbutton-like depressing portion 37b projecting upwardly from the upper end of the outer cylinder 36 or key cylinder case 34, while the lower portion of the inner cylinder 37 extending downwardly from the lower end of the outer cylinder 36 is formed into a shaft portion 37c having a flat cross section as shown in FIG. 6. In the above construction, the inner cylinder 37 is urged upwardly by a spring (not shown) disposed between said cylinder 37 and the outer cylinder 36 so that the depressing portion 37b thereof may project upwardly.

Meanwhile, in the upper end portion of the key block 32 located below the key cylinder 35, there is formed an elongated opening 32a corresponding in cross sectional shape to that of the shaft portion 37c at the lower portion of said key cylinder 35 (inner cylinder 37) as shown in FIG. 6, while the upper end of said operating rod 31 is connected to the lower end of said key block 32, with a spring 38 being disposed between the end of the key block 32 and the bottom surface of the casing 12 for urging said key block 32 upwardly. As shown in the solid lines in FIGS. 2 and 6, when the inner cylinder 37 is depressed downwardly under the state where the shaft portion 37c of the key cylinder 35 intersects at right angles with the elongated opening 32a at the upper end of the key block 32, said key block 32 is similarly depressed downwardly through contact of the lower end of the shaft portion 37c with the upper end face 32b thereof, but when the elongated opening 32a and the shaft portion 37c are located in the same direction as shown by the chain line in FIG. 6 and FIG. 7, said key block 32 is not adapted to be depressed downwardly even when the inner cylinder 37 is depressed, with the shaft portion 37c only entering the elongated opening 32a.

Subsequently, functionings of the rear seat back locking arrangement as described so far will be explained hereinbelow.

Now, under the state where the interior of the passenger compartment 4 is separated from the interior of the trunk room 5 by the seat back 3 which is held in the erected state, it is assumed, for example, that the seat back 3 is to be turned down forwardly for accommodating baggage into the trunk room 5 from the side of the compartment 4. In this case, the upper portion of the inner cylinder 37 in the key cylinder 35 constituting the operating portion 30, i.e. the pushbutton-like depressing portion 37b projecting upward, is pressed downwardly, and in the case where the key cylinder 35 is in the locked state, the shaft portion 37c at the lower portion of said inner cylinder 37 is located to be intersecting at right angles with respect to the elongated opening 32a of the key block 32 positioned therebelow as shown in FIGS. 2 and 6, whereby upon depression of the depressing portion 37b, the shaft portion 37c is to press down the key block 32 against the spring 38. Therefore, the operating rod 31 connected, at its upper end, to the key block 32 is displaced downwardly (in the direction indicated by an arrow C), while the releasing member 26 in the locking portion 20 connected to the lower end of said rod 31 is to be pivoted downwardly as shown by a chain line in FIG. 5. In the above case, in the locking portion 20, the engagement between the releasing member 26 and the first arm 24a of the engaging member 24 is released, and thus, said engaging member 24 is rotated in the direction of the arrow A by the spring 27 from the engaged position shown by the solid line to the released position shown by the chain line in FIG. 3. Accordingly, it becomes possible for the striker member 7 engaged and held, at its connecting bar 7b, in the recess 24r between the first and second arms 24a and 24b, to be relatively disengaged rearwardly from said recess 24r, and in other words, it becomes possible for the seat back 3 to be turned downwardly.

Meanwhile, when the seat back 3 is pivoted into the erected state again from the turned down state, the striker member 7 relatively comes in from the rear side in the B direction with respect to the engaging member 24 located in the released position indicated by the chain line in FIG. 3. The connecting bar 7b thereof entering the recess 24r between the first and second arms 24a and 24b so as to cause the engaging member 24 to be pivoted in the direction opposite to that indicated by the arrow A against the spring 27. In this case, the first arm 24a of the engaging member 24 contacts as inclined face 26a of the releasing member 26 urged upwardly by the spring 38 through the operating rod 31 as shown by the chain line in FIG. 5 to depress said releasing member 26 downwardly, and is further rotated to be engaged with said releasing member 26 (projecting portion 26b) through the pivotal upward movement of the releasing member 26 by the spring 38, when it has passed over the projecting portion 26b of said releasing member 26. This permits the engaging member 24 to be fixed at the engaged position shown by the solid line in FIG. 3, and consequently, prevents the striker member 7 to be disengaged from the recess 24r of the engaging member 24, with the seat back 3 being to be locked in the erected state.

Accordingly, in the condition where the seat back 3 is locked in the erected state, when the locking is to be prevented from being released, the specific key is inserted into the key inserting opening 37a of the inner cylinder 37 in the key cylinder 35, and is drawn out therefrom after the inner cylinder 37 has been rotated through a predetermined angle up to the locking position. Even in this case, the inner cylinder 37 may be depressed downwardly by the depressing portion 37b at the upper portion. However, since the shaft portion 37c at the lower portion is aligned in the direction, to the elongated opening 32a of the key block 32, the shaft portion 37c merely enters the opening 32a even upon depression of said depressing portion 37b, and said key block 32 is not depressed downwardly. Therefore, it is impossible to pivot the releasing member 26 in the locking portion 20 downwardly through the operating rod 31, and consequently, the engagement between the engaging member 24 and the striker member 7 can not be released.

By the above construction, unless the inner cylinder 37 is rotated to the unlocking position by the use of the key, the seat back 3 can not be turned down in a forward direction even upon operation of the depressing portion 37b, and thus, it becomes impossible, for example, for a child to enter the interior of the trunk room 5 or for any person to remove baggage within said trunk room 5 from the side of the compartment 4. Meanwhile, in the case where pressure is applied to the depressing portion of the inner cylinder 37 with the intention of forcibly releasing the locking without employment of the key in the state where the releasing of the locking of the seat back 3 is made impossible as described above, said inner cylinder 37 is idly moved downwardly and therefore, damages to the key cylinder 35 and/or locking portion 20 may be advantageously prevented.

As is clear from the foregoing description, according to the rear seat back locking arrangement of the present invention, it is so arranged that, in the construction in which the locking portion for holding the seat back in the erected state through engagement with the striker member fixed to the vehicle body, and the operating portion for releasing the engagement between the locking portion and the striker member, are provided on said rear seat back which can be forwardly turned to partition the passenger compartment from the trunk room, the operating portion is constituted by the key cylinder which controls the releasing of the locking portion. The operating portion can be depressed when releasing of the locking member is made impossible by the key cylinder, and therefore, when the key cylinder is operated for the locking, with the seat back being locked in the erected state, it becomes impossible to turn down said seat back in the forward direction, unless the specific key is employed, whereby disadvantages discussed above, may be prevented. Particularly, according to the present invention, since the operating portion is constituted by the key cylinder, the construction is simplified, and the locking arrangement not readily damaged even by forced operations can be advantageously presented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A rear seat back locking arrangement for a motor vehicle and the like which comprises:
   (a) a rear seat back arranged to partition an interior of a passenger compartment of the motor vehicle from an interior of a trunk room thereof so as to be capable of being turned down forwardly about its lower edge and having a recess formed adjacent to a peripheral edge at its rear surface in a position confronting a vehicle body when erected,
   (b) a striker means fixed at the vehicle body side to confront said recess of the rear seat back and adapted to project toward the rear surface of said rear seat back so as to be fitted into said recess, and
   (c) a rear seat back locking means provided on the rear seat back and having a lock means and an operating means, said lock means provided in said recess further including an engaging means engageable with said striker means so as to make it possible to lock the rear seat back, and a releasing means which enables the engaging means to be released from the locked state in association with movement of the operating means, said operating means which effects locking and unlocking of said lock means including a moving means to be moved through manual operation, and a cancelling means positioned between the moving means and the releasing means, said cancelling means cancelling the lock releasing function of said releasing means by the moving means, while permitting movement of said moving means.

2. A rear seat back locking arrangement as claimed in claim 1, wherein said striker means includes a pair of spaced projecting bars provided at the vehicle body side, and a connecting bar connecting said projecting bars at distal ends thereof directed toward the side of the rear surface of the seat back portion, said engaging means being pivotally supported with respect to the rear seat back for selective engagement with or disengagement from said connecting bar of said striker means.

3. A rear seat back locking arrangement as claimed in claim 1, wherein said engaging means is pivotally supported by a shaft secured to the rear seat back so as to take a first position to be engaged with the striker means and a second position to be released from said striker means, and is normally urged toward said second position by a spring means, the engaging means being engaged with the releasing means, while said engaging means is located at said first position, and prevented from movement toward said second position.

4. A rear seat back locking arrangement as claimed in claim 1, wherein said releasing means is rotatably supported by a shaft secured to the rear seat back so as to take a third position to be engaged with said engaging means and a fourth position to be released from the engagement with said engaging means, said releasing means and said moving means being mechanically associated with each other.

5. A rear seat back locking arrangement as claimed in claim 1, wherein said mving means is provided at the upper part of said rear seat back, and includes an inner cylinder movably supported for movement in an axial direction of an outer cylinder fixed to the rear seat back with respect to said outer cylinder so as to take a fifth position before manual operation and a sixth position after the manual operation, said inner cylinder being provided with a key insertion hole and capable of being rotated about the outer cylinder axis to take a seventh position from the fifth position through operation by a specific key.

6. A rear seat back locking arrangement as claimed in claim 5, wherein said cancelling means permits a mechanical association for moving the releasing means from the third position to the fourth position upon displacement of the moving means from the fifth position to the sixth position through manual operation, and also allows the moving means located at a seventh position to be moved to an eighth position through manual operation, but cancels the displacement of said releasing means from the third position to the fourth position for retaining at said third position.

7. A rear seat back locking arrangement as claimed in claim 6, wherein said cancelling means is disposed between said moving means and said releasing means, and includes an associated depressing means fixed to the inner cylinder and a cylinder means associated with the releasing means, said cylinder means and said depressing means being engaged with each other when said moving means is at the fifth and sixth positions, and disengaged from each other when said moving means is at the seventh and eighth positions.

8. A rear seat back locking arrangement as claimed in claim 7, wherein said depressing means has a flat cross sectional shape, and said cylinder means has an elongated opening in which said depressing means can be inserted during the displacement from the seventh position to the eighth position.

* * * * *